US006141986A

United States Patent [19]
Koplin

[11] Patent Number: 6,141,986
[45] Date of Patent: Nov. 7, 2000

[54] INDIRECT SUPPLEMENTAL EVAPORATION COOLER

[76] Inventor: Edward C. Koplin, 911 W. 36th St., Suite 201, Baltimore, Md. 21211

[21] Appl. No.: 09/196,598

[22] Filed: Nov. 20, 1998

[51] Int. Cl.[7] .................... F28D 5/00

[52] U.S. Cl. .................... 62/304; 62/311; 62/314; 62/332

[58] Field of Search .................... 62/311, 304, 314, 62/332

[56] References Cited

U.S. PATENT DOCUMENTS

| | | | |
|---|---|---|---|
| 3,992,894 | 11/1976 | Antonetti et al. | 62/129 |
| 4,139,356 | 2/1979 | Hattori | 62/278 |
| 4,464,315 | 8/1984 | O'Leary | 261/110 |
| 4,513,351 | 4/1985 | Davis et al. | 361/384 |
| 4,901,919 | 2/1990 | Wainwright | 62/311 |
| 5,113,668 | 5/1992 | Wachs, III et al. | 62/305 |
| 5,325,681 | 7/1994 | Ellis et al. | 62/314 |
| 5,555,742 | 9/1996 | Kelley | 62/311 |
| 5,598,719 | 2/1997 | Jones et al. | 62/304 |
| 5,911,745 | 6/1999 | Conner | 62/332 |
| 5,925,231 | 7/1999 | Metzger | 205/127 |
| 5,970,723 | 10/1999 | Kinkel et al. | 62/121 |

*Primary Examiner*—William Doerrler
*Assistant Examiner*—Mark Shulman
*Attorney, Agent, or Firm*—Howard L. Rose

[57] ABSTRACT

A cooler for an air conditioning system or other system having a heated surface to be cooled has an array of nozzles for issuing a fine spray of liquid. A fan of the cooler induces flow of air over a surface to be cooled, the nozzles issuing into the flow of air the fine spray at a distance from the heated surface such that the liquid of the fine spray is fully evaporated prior to contact with the heated surface. Drop sizes of 20 to 30 microns are typical.

11 Claims, 2 Drawing Sheets

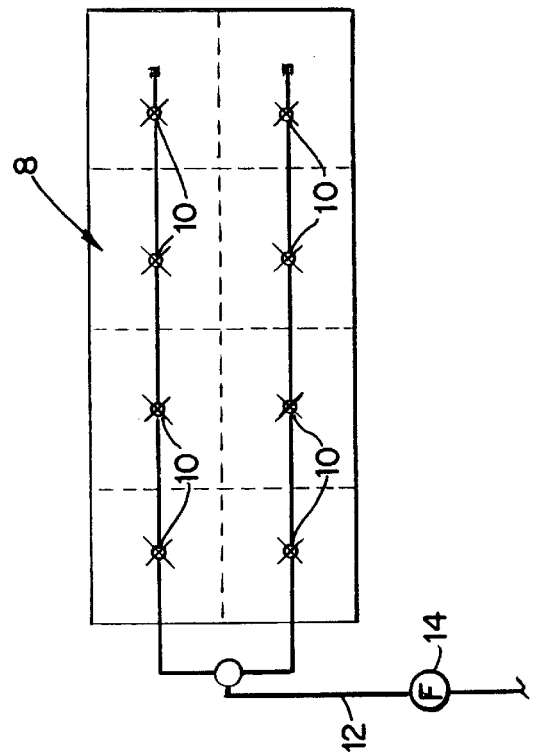
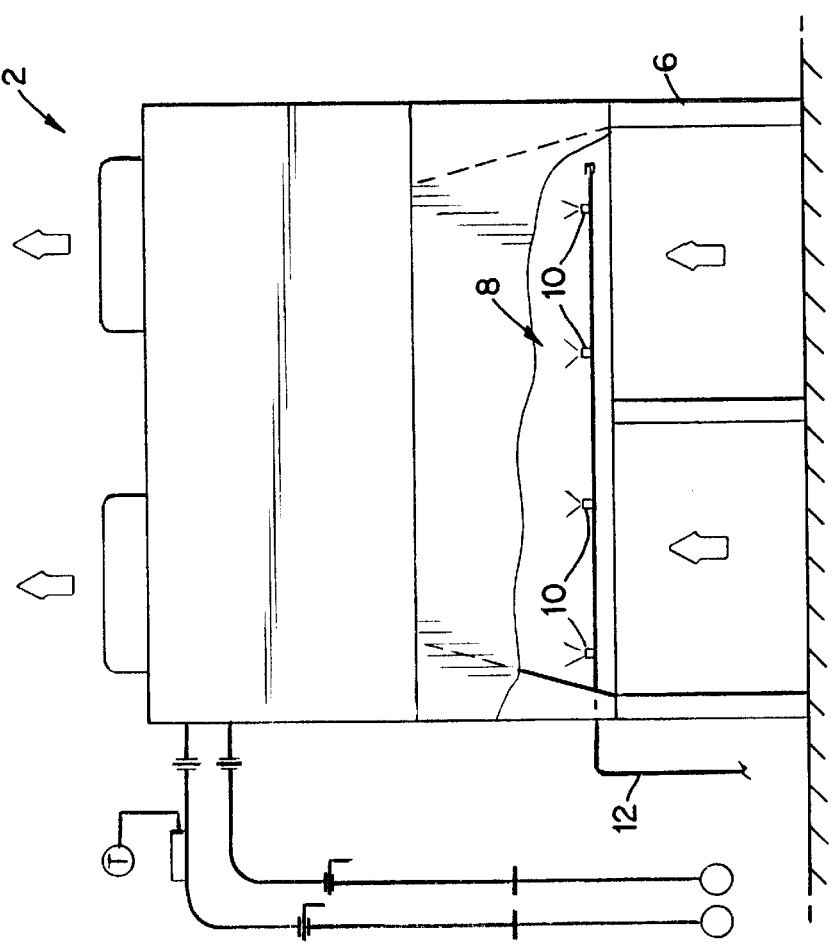

INDIRECT SUPPLEMENTAL EVAPORATION COOLER

FIELD OF THE INVENTION

The present invention relates to indirect supplemental evaporative cooler apparatus and method, and more particularly to the production in cooling apparatus of air of greatly reduced temperatures.

BACKGROUND OF THE INVENTION

The majority of air conditioning systems reject the heat absorbed by the refrigeration cycle through an air cooler heat exchange process. A fan forces outside air through a finned tube heat exchange coil called an air cooled condenser, to cool the hot refrigerant gas or a hot liquid heat transfer medium such as water or an anti-freeze solution. The air-cooler condenser/heat exchanger has many benefits including:

1. Low cost construction,
2. Reliability during freezing weather,
3. A low profile that does not extend above a roofline, and
4. Minimal maintenance requirements.

A popular version of air cooled refrigeration systems, used extensively in data centers and industrial process environments, adds an additional heat exchange by absorbing refrigerant heat into circulating brine and then cooling the brine in an outside air cooled coil called a "dry cooler." The circulation of brine overcomes many piping design obstacles that are imposed by air-cooled condensers but the additional heat exchange imposes efficiency losses that are exacerbated by hot weather. These systems become unstable and inefficient, for cooling. Energy efficiency, capacity and reliability diminish as outside air temperature increases. The additional wear and tear reduces the life expectancy of an air-cooled system to as much as 50% of that expected from an evaporative cooled system.

To increase capacity, reliability and energy efficient during hot weather, evaporative cooling processes have been developed to assist the refrigeration process. The evaporative process is more efficient during hot weather because the evaporation of moisture into hot outside air reduces the dry air temperature as much as 20° F. The reduced temperature air causes greater heat exchange in the coils, lowers energy consumption and increases the stability, reliability and longevity of the refrigeration system. A typical evaporative system will reduce outside air temperature from 95° F. to 75° F. The trade-off for these benefits is that all evaporative cooling systems; cooling towers, evaporative condensers and evaporative industrial fluid coolers are maintenance intensive and susceptible to catastrophic freezing. Maintenance programs must be implemented to counteract the effects of corrosion, biological fouling, mud accumulation, etc. Poisons are added to the evaporative water sumps to inhibit both corrosion and biological growth. These chemicals when drained into municipal piping systems cause environmental problems. Many municipalities have banned these chemicals to protect their water systems, further complicating the maintenance of the evaporative systems. Additionally, while these evaporative systems provide excellent stability for refrigeration systems by lowering the temperature of outside air, they are the primary source for propagating deadly microorganisms such as Legionellae pneumophilia, the source of Legionnaire's Disease. Local architectural codes preclude the use of evaporative systems because they are tall and extend above the roofline of buildings. Their large evaporative steam plumes look very industrial and drift from the plumes has been known to infect individuals downstream with Legionnaire's Disease. Additionally, the continuous availability requirements of some businesses require heat rejection during freezing weather. Traditional evaporative equipment exposes large surfaces, pipe and basins full of water to catastrophic freezing. The risks to high reliability facilities such as hospitals, data centers or manufacturers are obvious.

An additional risk to continuous availability type facilities from evaporative systems is the high quality of water that is required for all evaporative cooling. If the municipal services providing make-up water are interrupted, these facilities will shut down.

BRIEF DESCRIPTION OF THE PRESENT INVENTION

In accordance with the present invention, fine droplets of water are sprayed into a moving stream of air. The droplets are of such a size as to be evaporated before contacting a heated surface to be cooled. Upon contact with the heated surface, the air with the vaporized water is unheated and the temperature rises out of contact with the heated surface. Thus, the process cools the air by removing the heat of vaporization from the air, but does not wet the heat exchange surface. The combination of dry air cooling and indirect evaporative cooling provides a number of benefits:

1. The system is only active during the hot weather; thus, standing water in piping is eliminated during the entire freezing weather season.
2. Water quantities required are a small fraction of those needed with all evaporative systems.
3. Water pressures required are low enough to retain the use of conventional piping systems and materials.
4. Pressures required are low enough to retain the use of centrifugal pumps that eliminate many moving parts, which are single points of failure.
5. The system eliminates the use of compressed air to assist with the atomization of the water. Air compression is energy and maintenance intensive.
6. The loss of city make-up water retains the use of the dry cooler to provide some cooling effect until make-up water is restores.
7. The indirect evaporative process occurs within a short distance 18"–36" (500 mm–1,000 mm) providing the opportunity to retrofit existing air-cooled systems. The system is compact and can provide benefit to both new installations, as well as being retrofit to existing heat rejection systems.
8. The architectural rooflines of buildings are preserved.
9. The energy efficiency of the heat rejection system is significantly improved.

Elimination of corrosion of the heat exchange surface, together with elimination of biological growth and dangerous resides are achieved. It must be noted that in the system, the benefits of both the air-cooled systems and the evaporation concept have been retained, while the drawbacks of both are eliminated. The system is highly efficient and economical, eliminating the need to chemically treat the cooling make-up water, as in some prior systems.

The droplet size of the water is critical, and must be of such or size as to be fully evaporated prior to contact with the surface to be cooled. The desired droplet size is achieved by the use of water, city or otherwise, driven at high pressure through fogging nozzles having orifices of 500–700 microns. The pressure employed is in the range of approximately 500 psi to produce droplet sizes of 10 to 20 microns out of the nozzle. The temperature of the air is reduced by as much as 20° F. to 30° F.

The above and other features, objects and advantages of the present invention, together with the best means contemplated by the inventor thereof for carrying out the invention will become more apparent from reading the following description of a preferred embodiment and perusing the associated drawings in which:

BRIEF DESCRIPTION OF THE DRAWINGS

FIG. 1 is a view in elevation of an air-cooled cooler mounted on a stand;

FIG. 2 is a plan view of a nozzle array employed with the cooler of FIG. 1; and

DETAILED DESCRIPTION OF THE PRESENT INVENTION

Figure 3:
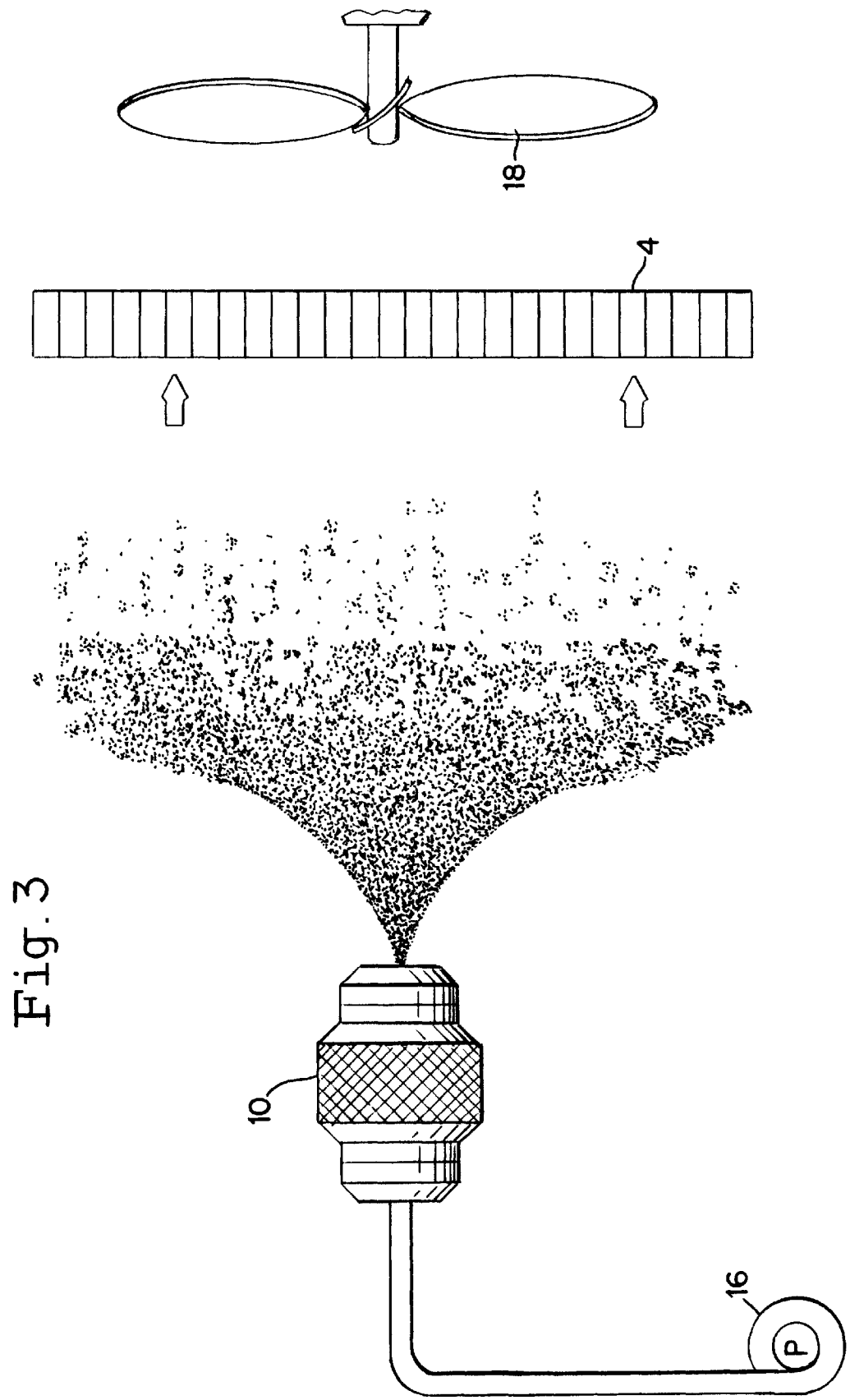
FIG. 3 is representative of the liquid spray pattern applied to a finned tube heat exchanger with induction fan.

Referring now to FIG. 1 of the accompanying drawings, there is illustrated a standard dry air cooler 2 having a finned tube heat exchanger 4, see FIG. 3. The size of cooler 2 is a function of the heat that must be dissipated. The heat exchanger is typical for a majority of air-cooled heat rejection systems.

The cooler 2 in this instance has been placed on a stand 6 to raise it off a roof or other support surface by about 18 to 36 inches. A support frame 9, for instance, is welded or otherwise secured to the bottom of legs 11 of the cooler 2 to support the array 2 of nozzles 10. A sheet metal skirt surrounds the area between the frame 9 and the bottom of the cooler 2. The 18" to 36" below the frame 9 provides an uninhibited flow of air to the cooler 2 through the frame 9 and the array 8 of nozzles.

The Spraying Systems Co. supplies an example of a nozzle that may be employed, its Model No. 1/4-LN-1. As illustrated in FIG. 2, the array is disclosed as having eight nozzles 10. The nozzles are fine atomizing spray nozzles having an orifice sufficient to produce droplets in the 5 to 30 micron range. At the typical air velocities and temperatures designed into typical air cooler systems these droplet sizes will allow the water to evaporate into the air in a short distance. The distance of the nozzles from the surface to be sprayed is a function of many factors, but a distance of 18" to 24" has been chosen for use in the nozzles of the Spraying Systems Company's nozzles. The distance desired is chosen to an economically practical retrofit to existing equipment. At distances closer than 18", some water impingement is usually encountered in excessive amounts. The lack of water (liquid) impingement and the ability to operate at short distances are critical elements of this process.

The nozzles are situated to spray upward as illustrated in FIG. 1 and are supplied with pressurized liquid, preferably water, via a pipe 12 having a 5-micron filter 14 in the pipe 12. Water under pressure is supplied at approximately 500 to 700 psi to the nozzles 10 from a high pressure multistage centrifugal pump 16 available from Tonkaflo Pumper and others. It is preferable to operate at about 500 psi from a cost point of view; up to 700 psi is costly, but will work, requiring use of positive displacement pumps. Ultrasonic stimulation of the evaporative water has also been employed to eliminate the energy and pressure requirements needed to produce the small water droplet sizes. In such a system, the standard nozzles are replaced with nozzles that produce ultrasonic stimulation, such as BNB series humidifier nozzles available from Study of North America in Frederik, Md.

Referring now specifically to FIG. 3 of the accompanying drawings, induction fan 18 of the cooler 2, produces airflow from left to right through the heat exchanger 4, as viewed in FIG. 3. The injection nozzles 10 are situated in the airflow created by the fan 18. The fan 18 draws the air through finned tubes of the heat exchanger 4 at a rate determined by the capacity of the system. The nozzles 10 produce a very fine spray in a range of about 5 microns to 30 microns. The nozzles 10 are located at a distance from the heat exchanger 4 such that the droplets are fully evaporated before they contact the finned tubes, 18 inches to 36 inches, as stated above. The liquid derives the heat of vaporization from the air and thus the temperature of the air is materially reduced. Reductions of twenty to thirty degrees Fahrenheit are readily obtained.

Upon striking the hot tubes of the heat exchanger 4, the air with the evaporated water is caused to rise and exit out of the top of the cooler 2 without wetting any of the surfaces contacted. Thus, corrosion and related problems are readily avoided. Also, the cost of water collection and processing is virtually eliminated.

Various other factors come into play. The system will not work in an environment of 100% humidity, since the droplets will not evaporate quickly. Obviously also other (larger) drop sizes can be employed, but the distance of the nozzles from the surfaces to be cooled increases rapidly, and is not desirable in most instances.

In another area, dry cooling is efficient at temperatures below 85° F. air dry bulb. Above 85° F., 100% humidity is rare, so that the present invention is fully effective at temperatures above 85° F. at less than 100% humidity. In tests conducted, when air temperatures rose above 85° F., the water always evaporated.

During hot weather, and a simultaneous loss of make-up water, the dry cooler is sufficient to revert some portion of heat rejection until water is again available.

It should be noted that the system illustrated is the inventor's initial production design and various modifications can be made in the equipment, and in particular the specific pieces of equipment specified herein. The essential feature is that the water be substantially fully evaporated before contact with surfaces to be cooled.

Once given the above disclosure, many other features, modifications and improvements will become apparent to the skilled artisan. Such features modifications and improvements are, therefore, considered to be a part of this invention, the scope of which is to be determined by the claims.

What is claimed is:

1. An air-water cooling system for use with an evaporative cooling system having cooling coils and an induction fan for creating a stream of air impinging on the coils, a source of small droplets of liquid for projecting the droplets into a stream of air directed toward cooling coils of an air conditioning system, said source located at a distance from cooling coils to be cooled such that the droplets evaporate before contacting the cooling coils.

2. An air-water cooling system according to claim 1 wherein, said source issues droplets of 5 to 30 microns in size.

3. An air-water cooling system according to claim 2 wherein said droplets are issued 18 to 36 inches from the coils to be cooled.

4. An air-water cooling system according to claim 3 wherein said source issues droplets at a pressure of 500 to 700 psi.

5. An air-water cooling system according to claim 3 wherein said source issues droplets at a pressure or approximately 500 psi.

6. An air-water cooling system according to claim 5 for use with an evaporative cooling system, wherein said source is a centrifuge pump.

7. An air-water cooling system according to claim 5 for use with an evaporative system, wherein said source is an ultrasonic source of sufficient intensity to atomize water to form droplets of the requisite size.

8. A method for rapidly cooling air to be injected into a stream of air directed at cooling coils of a dry cooler comprising, establishing a stream of air across cooling coils of a dry cooler, injecting into the stream of air droplets of a size such as to fully evaporate prior to contacting the cooling coils.

9. A method according to claim 8, wherein rapidly cooling air to be injected into a stream of air directed at cooling coils of a dry cooler, further comprising forming the droplets in a range of sizes of 5 to 30 microns.

10. A method according to claim 9, wherein rapidly cooling air to be injected into a stream of air directed at cooling coils of a dry cooler issuing the droplets at 18 to 36 inches from the coils at a pressure of approximately 500 psi.

11. An air-water cooling system for use with an evaporative cooling system having cooling coils and an induction fan for creating a stream of air impinging on the coils, a source of small droplets of liquid for projecting the droplets into a stream of air directed toward cooling coils of a cooling system, said source located at a distance from cooling coils to be cooled such that the droplets evaporate before contacting the cooling coils.

* * * * *